(12) United States Patent
Lamarche et al.

(10) Patent No.: US 6,414,953 B1
(45) Date of Patent: *Jul. 2, 2002

(54) MULTI-PROTOCOL CROSS CONNECT SWITCH

(75) Inventors: Francois Lamarche, McGee Laprairie; John Gauthier, Mascouche, both of (CA)

(73) Assignee: Tech Laboratories Incorporated, North Haledon, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,979

(22) Filed: Dec. 23, 1996

(51) Int. Cl.[7] .................... H04L 12/50; H04L 12/28; H04J 3/16

(52) U.S. Cl. ............... 370/359; 370/422; 370/466; 340/2.28

(58) Field of Search ............... 370/359, 380, 370/372, 357, 361, 200, 466, 477, 422, 427, 420, 419; 340/825.79, 825.8, 2.28, 825, 8.5; 708/135; 379/306, 291, 335

(56) References Cited

U.S. PATENT DOCUMENTS

| | | | | |
|---|---|---|---|---|
| 3,727,006 A | * | 4/1973 | Jacob | 179/18 GF |
| 4,057,711 A | * | 11/1977 | Asthana et al. | 364/600 |
| 4,301,475 A | * | 11/1981 | McCoy | 358/181 |
| 4,539,564 A | * | 9/1985 | Smithson | 340/825.79 |
| 4,849,977 A | * | 7/1989 | Baun, Jr. et al. | 371/49 |
| 5,274,631 A | | 12/1993 | Bhardwaj | 370/60 |
| 5,500,753 A | * | 3/1996 | Sutherland | 359/125 |
| 5,574,722 A | * | 11/1996 | Slykhouse et al. | 370/56 |

FOREIGN PATENT DOCUMENTS

| | | | | |
|---|---|---|---|---|
| CA | 2 280 573 A | * | 1/1995 | H04L/12/433 |
| CA | 2 280 826 A | * | 8/1995 | H04L/12/42 |
| CA | 2 300 330 A | * | 10/1996 | H04Q/3/545 |
| EP | 0 624 043 A1 | | 11/1994 | H04Q/1/14 |
| EP | 0624043 A1 | * | 11/1994 | H04Q/1/14 |
| GB | 2 280 573 A | | 2/1995 | H04L/12/433 |
| GB | 2 280 826 A | | 2/1995 | H04L/12/42 |
| GB | 2 300 330 A | | 10/1996 | H04O/3/545 |

OTHER PUBLICATIONS

Saunders, S., "Best of Both Worlds for Hubs and Switches", Data Communications, vol. 23, No. 14, Oct. 1994, pp. 37–38.

* cited by examiner

*Primary Examiner*—Alpus H. Hsu
*Assistant Examiner*—Duc Ho
(74) *Attorney, Agent, or Firm*—Wolf, Greenfield & Sacks, P.C.

(57) ABSTRACT

The present invention relates to a cross connect switch which allows different protocols to be used. The switch is made up of two cross point modules, one for transmission and one for reception. I/O blocks corresponding to each station or network interface are connected to the cross point modules. Each I/O block includes four differential pairs. The I/O block permits selective activation for transmission or reception of any of the four pairs. In addition, half duplex control logic is used to implement protocols using a single differential pair for both transmission and reception. Also a token ring interface is included on the I/O blocks in order to allow detection and generation of phantom DC currents necessary for operation with token rings.

28 Claims, 7 Drawing Sheets

MULTI-PROTOCOL CROSS CONNECT SWITCH

FIELD OF THE INVENTION

The present invention relates to cross-connect switches for use in data networks. In particular, it relates to a cross-connect switch which can connect computers to various networks using different protocols.

DISCUSSION OF THE RELATED ART

Computer networks have expanded greatly in terms of numbers of computers connected to a network and the types of networks which exist. In fact, a single computer may be part of several networks with different capabilities. Networks also have various numbers of computers, from work groups, to local area networks, wide area networks, and global networks, such as the Internet and world wide web. With so many types of networks created by various companies, different protocols are used for communications. Examples of these protocols include RS 232, Ethernet, Fast Ethernet, Token Rings, and ISDN. These protocols not only require special communications software, but also have specific hardware connection requirements. The hardware connection requirements necessitate various interconnections between computers, servers, routers and other physical equipment in order to implement the selected protocols and communications.

In order to provide the necessary connections, offices are now wired for computer network connections. Typically, cables run horizontally across a floor to interconnect the computers on that floor. Various networking equipment, such as routers, hubs and bridges, are located within a wiring closet on the floor. The networking equipment in the wiring closets on different floors are interconnected with vertically running cables. The horizontal cables typically terminate at a patch panel within the wiring closet. The networking equipment also terminate in a patch panel. To provide a specific computer with a connection to the network, the appropriate locations within the patch panels are interconnected with patch cords.

When a user changes locations, the physical interconnections must also be changed to provide the user with access to the same network equipment. Frequent changes in workforce and work space has resulted in significant changes to networks. These changes require multiple accesses to the interconnections, and complicated interconnections. Such changes also increase the costs of maintaining a network and are likely to cause more frequent faults. Therefore, a need exists for a system which allows automated interconnections of computers and networks.

Several different systems have been proposed for automating connections in a wiring closet through the use of cross connect switches. However, each of these systems include protocol specific hardware for making the connections. Thus, if a single network is used, the computers can be easily rearranged; but if more than one network is part of the system, as in today's multi-protocol corporate data networks, automated changes in configurations are not possible. Plug-in cards (or equivalent hardware) of various types are used to interconnect the computers. Each plug-in card is designed for a specific communication protocol. When a computer is to be connected to a different network, the plug-in card for that computer has to be changed. Therefore, a need exists for an automated interconnection system which can operate with different protocols.

SUMMARY OF THE INVENTION

The present invention in great part overcomes the deficiencies of existing interconnection systems by providing a cross-connect switch which is operable with different protocols. According to one aspect of the invention, each device is connected to the interconnection system by programmable input/output (I/O) blocks. The I/O blocks include circuitry for executing different types of connections. Each I/O block has four differential pair inputs or outputs. The I/O block can use any set of these pairs, so as to accommodate different network protocols on different pairs.

According to another aspect of the invention, the I/O blocks provide for selective termination of each of the differential pairs. According to another aspect of the invention, the I/O blocks include circuitry to account for phantom current, half-duplex operation, and insertion losses.

According to another aspect of the invention, the I/O blocks are connected together through two crosspoint modules, one for transmission and one for reception. An output of each distribution side I/O block is connected to the transmit crosspoint module, and an input to the receive crosspoint module. The I/O blocks on the equipment side of the switch are connected to the crosspoint modules in reverse. Thus, by appropriately setting the connections in the cross point module, each computer on the distribution side can be connected to the appropriate network equipment on the equipment side. The crosspoint modules can be implemented as analog switches or digital routers, with sufficient bandwidth to accommodate different protocols.

DETAILED DESCRIPTION

Figure 1:
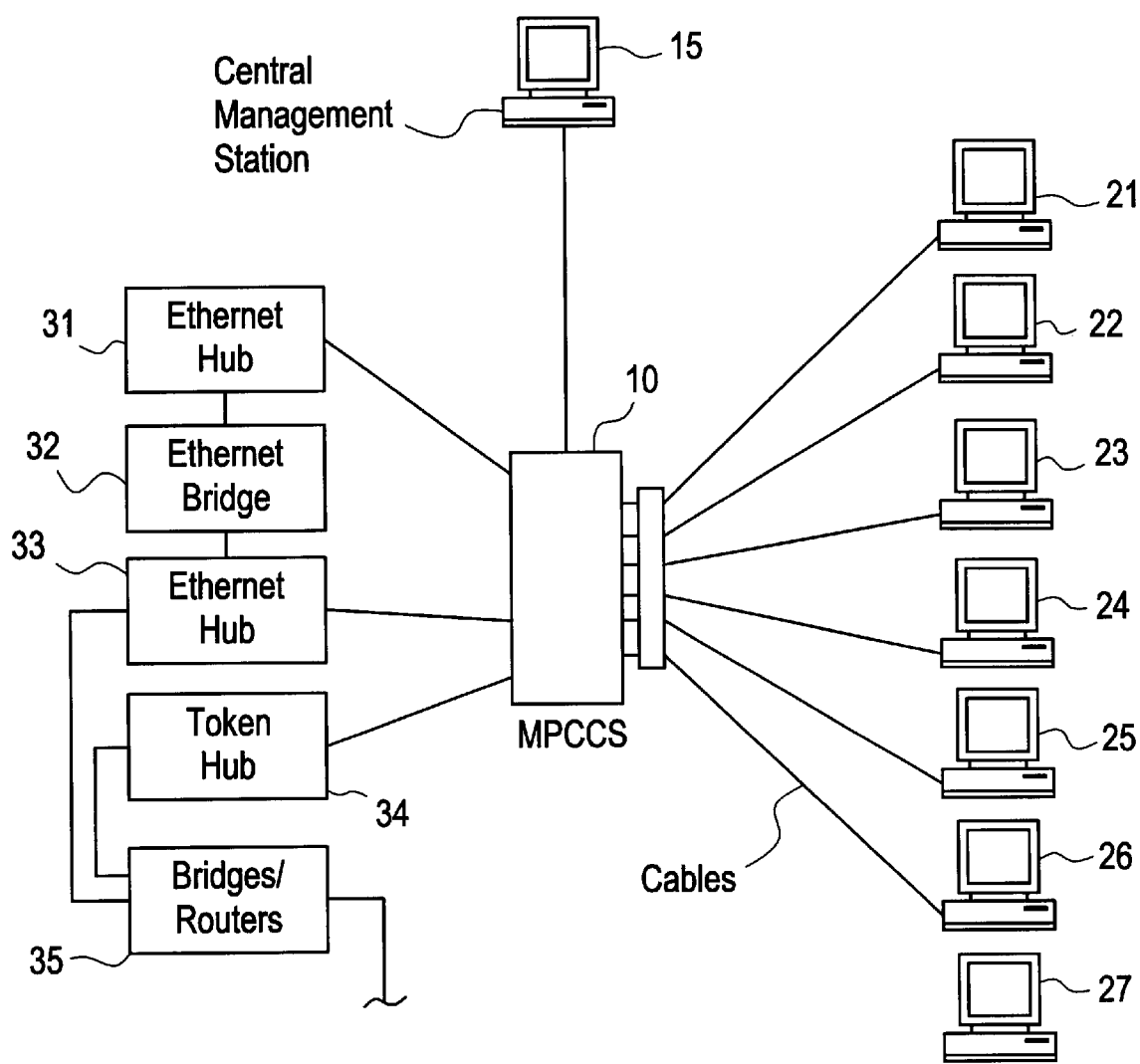
FIG. 1 illustrates a computer system including the multi-protocol cross connect switch of the present invention.

FIG. 1 illustrates the connections in the computer system utilizing the multi-protocol cross connect switch of the present invention. A multi-protocol cross connect switch 10 is connected on a distribution side to a variety of computers 21–27. On an equipment side, the cross connect switch 10 is connected to different types of networking interfaces, such as Ethernet hubs 31, 33 or a token ring hub 34. The interconnection interfaces may be connected together or connected to other interfaces at different locations through an Ethernet bridge 32 or other types of bridges or routers 35. The cross connect switch operates to connect each of the computers 21–27 to one of the interconnection interfaces 31–35 so that the computer is operating on a network. A central management station 15 is connected to the cross connect switch 10 in order to control the connections within the cross connect switch.

Figure 2:
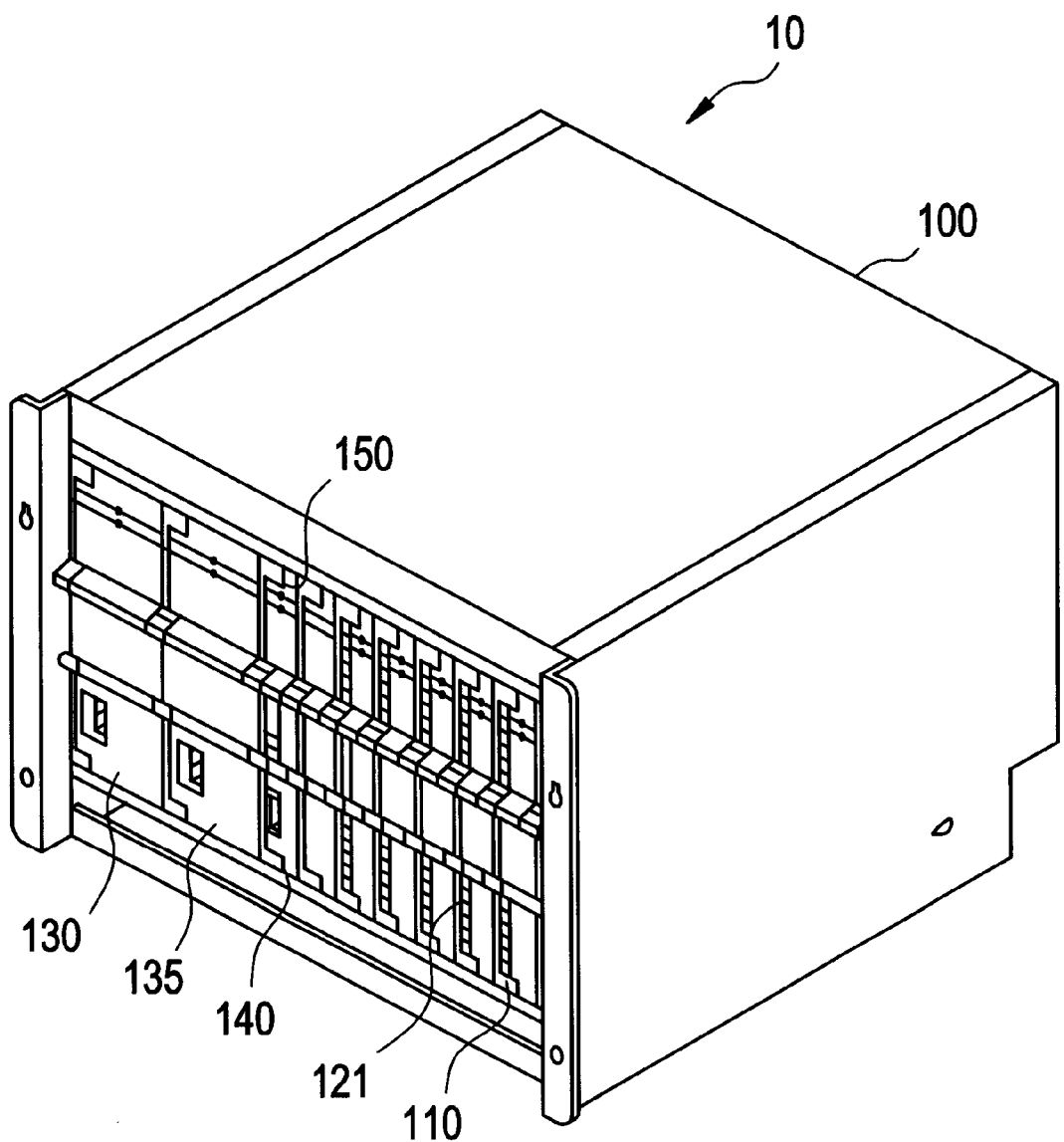
FIG. 2 illustrates a physical embodiment of the present invention.

FIG. 2 illustrates a physical embodiment of the present invention. As illustrated in FIG. 2, the cross connect switch 10 can be implemented as a set of cards which fit into an equipment rack. The rack can be designed to be installed in a standard 19 inch rack for interconnections with the networking interfaces. As illustrated in FIG. 2, the equipment rack can accommodate a variety of cards which implement the cross connect switch. Access cards 110 each include connections for up to 18 ports 121. The 19 inch rack can accommodate up to 6 distribution access cards and 6 equipment access cards. The access cards terminate four differential pairs on each port 121. As discussed below, typically two pairs in each port are switched through the system. Two cross point modules 130, 135 implement a switching fabric of 108×108×2 pairs. A main controller card 140 controls the access and crosspoint module cards. The main controller card also is an interface to the system software. An optional test card 150 is used to test the cables attached to the system. It can measure cable length, noise and impedance, and find miswires, cut and shorted cable. This information can then be sent to the central management station 15 through the main controller card 140. The system operator is thereby alerted to the equipment problems.

Figure 3:
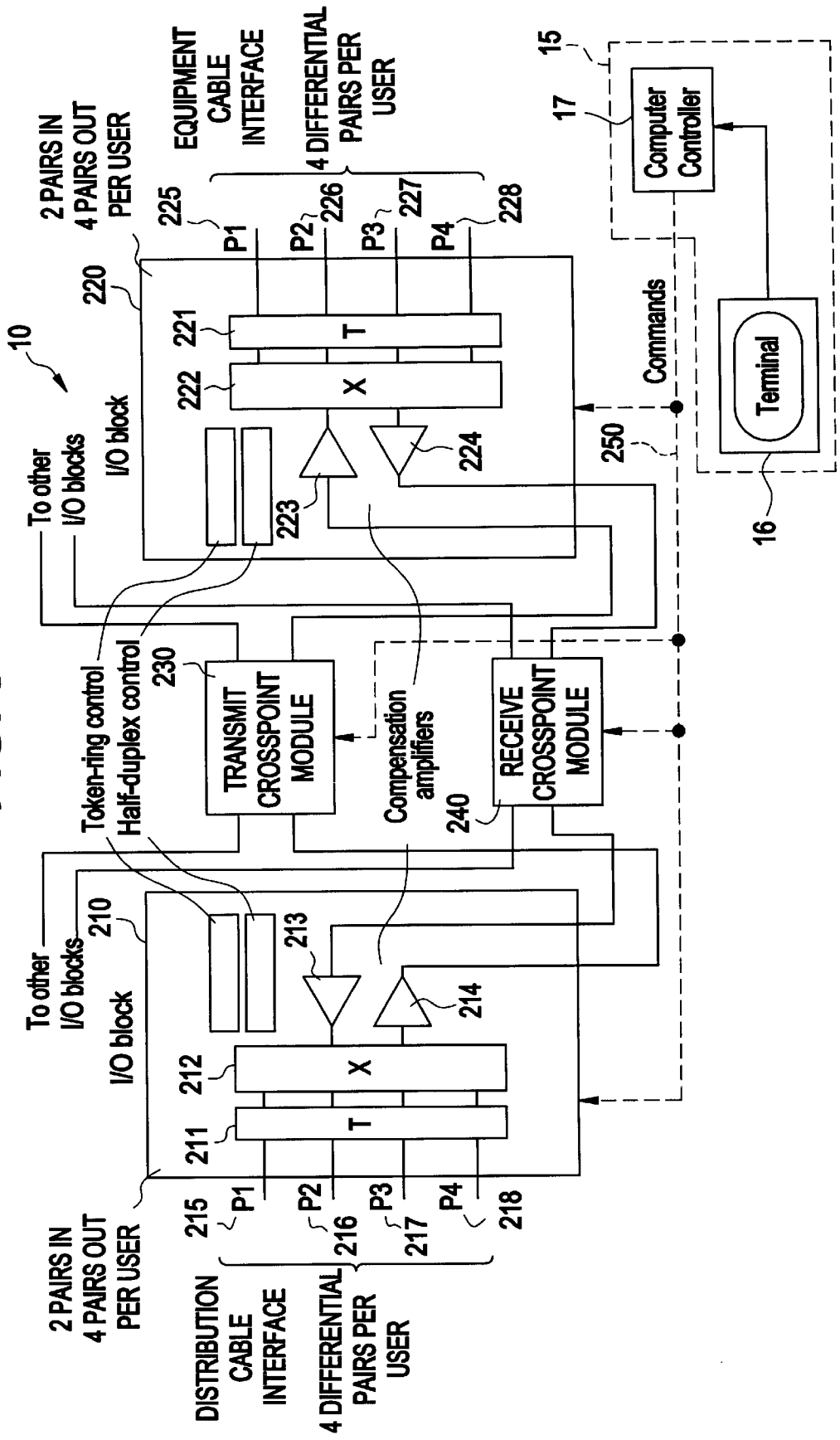
FIG. 3 is a block diagram illustrating an embodiment of the present invention.

FIG. 3 illustrates, in a block format, the components of the cross connect switch 10 according to an embodiment of the present invention. An input/output (I/0) block 210 is connected to each port 121 of the cross connect switch 10 for the distribution side. A second I/O block 220 is connected to each port on the equipment side. Two cross-point modules 230, 240 are used to interconnect the I/O blocks on the distribution side 210 and equipment side 220. The crosspoint modules can be analog switches or digital routers. According to a preferred embodiment, analog switches are used. Digital routing methods use techniques such as time division multiplexing on an internal master digital bus. Under the current state of the technology, digital routing has a number of drawbacks in a high speed multi-protocol environment. For example, bandwidths of several hundred gigahertz are required to be supported by the master digital bus if one is to support several tens of ports with protocols up to 125 megabits per second, such as TPDDI. Also, signal continuity and timing requirements of some protocols may not be met by time division multiplexing techniques. In particular, timing can be a problem when a random mixture of protocols operating at different speeds are cross connected. Unacceptable delays between packets may be introduced. Analog routing does not have the same limitations because a dedicated physical connection is implemented between each input and associated output port.

The I/O blocks 210, 220 for each port may also include analog or digital circuitry. Appropriate A/D and D/A converters (not shown) are used for connecting to the ports and crosspoint modules as necessary. The cross connect switch 10 is controlled by commands 250 from the central management station 15. The central management station 15 includes a computer controller 17 and a terminal 16. Commands 250 are input into the transmit crosspoint module 230 and receive cross-point module 240 in order to select the specific ports to be interconnected. Commands are also input into the I/O blocks 210, 220 for pair selection, pair termination, and implementation of half duplex control. A set of terminators 211 is selectively connectable to each of the pairs on a port. The terminators can be selectively connected and disconnected from the pair. Termination is required when a system is at the receiving end of a connection. Connection switches 212 are used to connect one of the four differential wire pairs 215–218 to each transmit crosspoint module 230 and receive crosspoint module 240. Compensation amplifiers 213, 214 are used to overcome signal strength losses in the cross connect switch.

Figure 4:
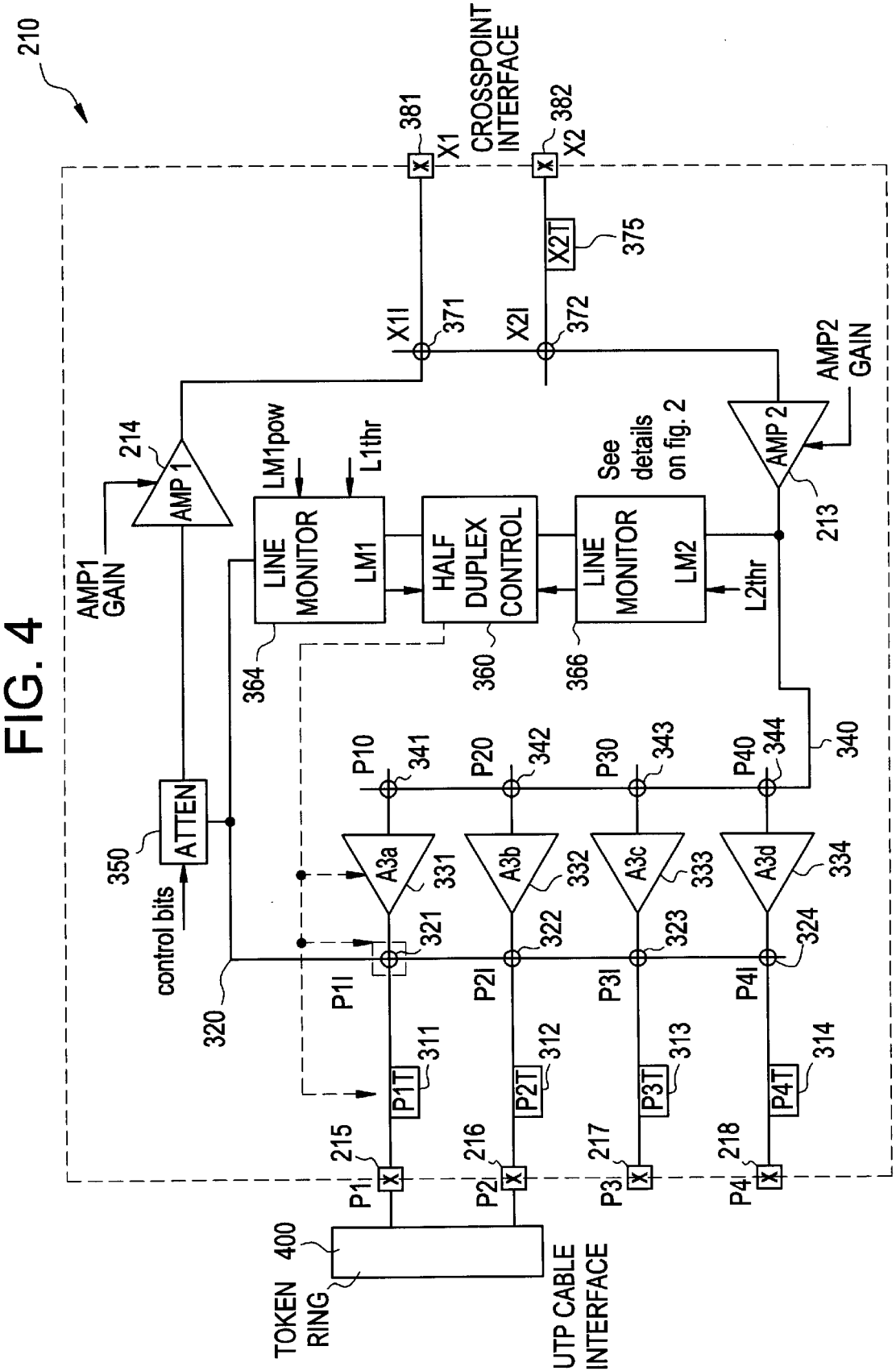
FIG. 4 is a block diagram illustrating portions of an I/O block according to an embodiment of the present invention.

FIG. 4 illustrates in more detail the elements of the I/O block 210. The elements of the equipment side I/O block 220 would be identical. The I/O block includes four differential pair input or output connections 215–218. The differential pairs are connected to two sets of switches 321–324, 341–344. Many protocols operate with only two differential pairs, one for transmission and one for reception. Reception switches 321–324 are used to select one of the differential pairs 215–218 as an input to the cross connect switch. Commands 250 from the computer controller 17 are used to selectively operate a single switch to connect one of the differential pairs 215–218 to the input line 320 of the I/O block. Similarly, commands from the computer controller 17 are used to selectively operate one of the transmission switches 341–344 to connect one of the differential pairs 215–218 to the transmission line 340 of the I/O block. The reception line 320 and transmission line 340 are selectively connected by switches 371, 372 to input and output ports 381, 382 of the cross-point modules. As noted previously, compensation amplifiers 213, 214 are used to compensate for signal losses in the I/O block. An antenuator 350 is also connected to the reception line in order to equalize signal amplitudes. Auxiliary amplifiers 331–334 can be used to further compensate for losses on the appropriate output selected pair. Terminators 311–314 are selectively connectable to each of the differential pairs 215–218 by commands from the computer controller 17. The reception differential pair can then be selectively terminated as needed. Similarly, the input 382 from the crosspoint modules can be selectively terminated by terminator 375 as needed.

FIG. 4 also illustrates circuitry for implementation of half duplex control. Half duplex protocol uses only one differential pair to communicate. The transmit and receive direction is switched on the single pair as required to accommodate the communications. When there is no communication, the selected port is configured as an input. Thus, the distribution I/O block 210 and the equipment I/O block 220 would both have a port configured as an input. When a communication packet is received at one I/O block, the other I/O block must be reconfigured as an output. When the communication packet is completed, both of the I/O blocks return their ports to input configurations. The port configuration is controlled by a half duplex controller 360 and two line monitors 364, 366. Line monitor 364 is connected to the reception line 320 when a line monitor 364 detects an incoming signal, and indicates the signal to the half duplex controller. A second line monitor 366 monitors the transmission line to determine whether a signal has been received from the cross-point module. When a signal is received from the cross-point module the line monitor indicates this receive signal to the half duplex controller 360. The half duplex controller then operates to control the transmission amplifier 331, the reception connection switch 321, and the terminator 311. Upon receipt of a transmission, indicated by line monitor 366, the amplifier 331 is enabled, the terminator 311 is disabled and reception connection switch 321 is disabled. When the transmission ends, the terminator is enabled and the reception switch is again enabled to monitor for receive signals.

Figure 5:
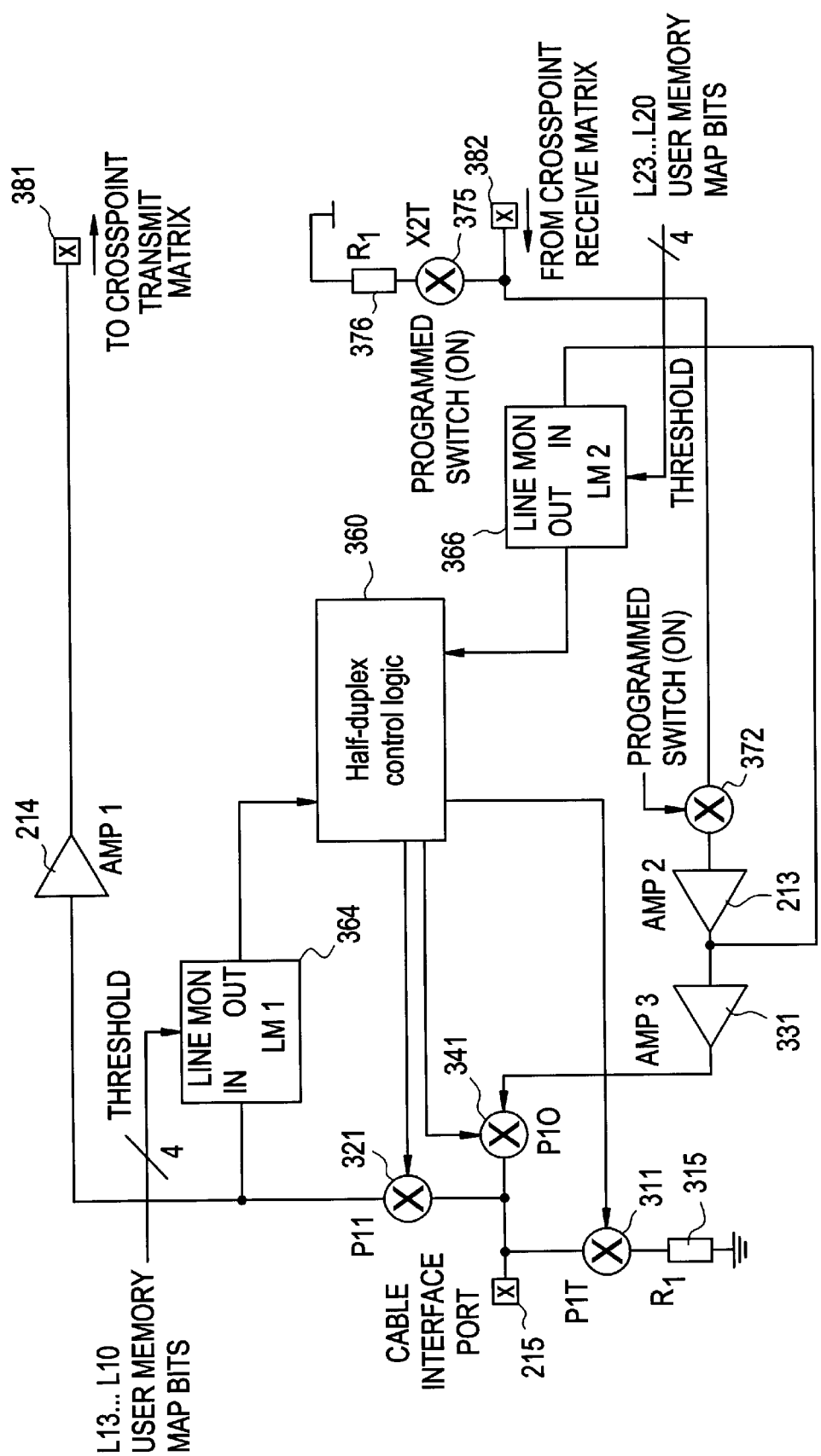
FIG. 5 is a block diagram illustrating half duplex control in the present invention.

FIG. 5 illustrates in greater detail the connections of the half duplex controller 360. The line monitors 364, 366 have inputs for user memory map bits representing a threshold. The line monitor compares the input signal with the threshold to determine whether a signal is being received. An output from the line monitor goes to the half duplex controller 360. The half duplex controller then controls the receive switch 321, sense switch 341, and termination switch 311. The termination switch 311 selectively connects and disconnects the input line from a resistor 315 to ground.

Protocols such as token ring require the generation of a DC phantom current flowing into the pairs being used for interconnection in order to have the connection inserting into the ring. In order to accommodate token ring type protocols, a token ring interface 400 is connected to the pairs of the relevant ports, as illustrated in FIG. 4. The interface detects the presence of a phantom current on the distribution side and regenerates it on the equipment side, and vice versa. When a fault exists on one side, it is detected by the circuit and relayed through the cross point switch to the other side. Some analog cross connect switch technologies cannot accommodate large DC currents present on wire pairs as required by some protocols. Couplings across the cross connect switch must be AC and the phantom DC currents have to be relayed by other mechanisms.

Figure 6A:
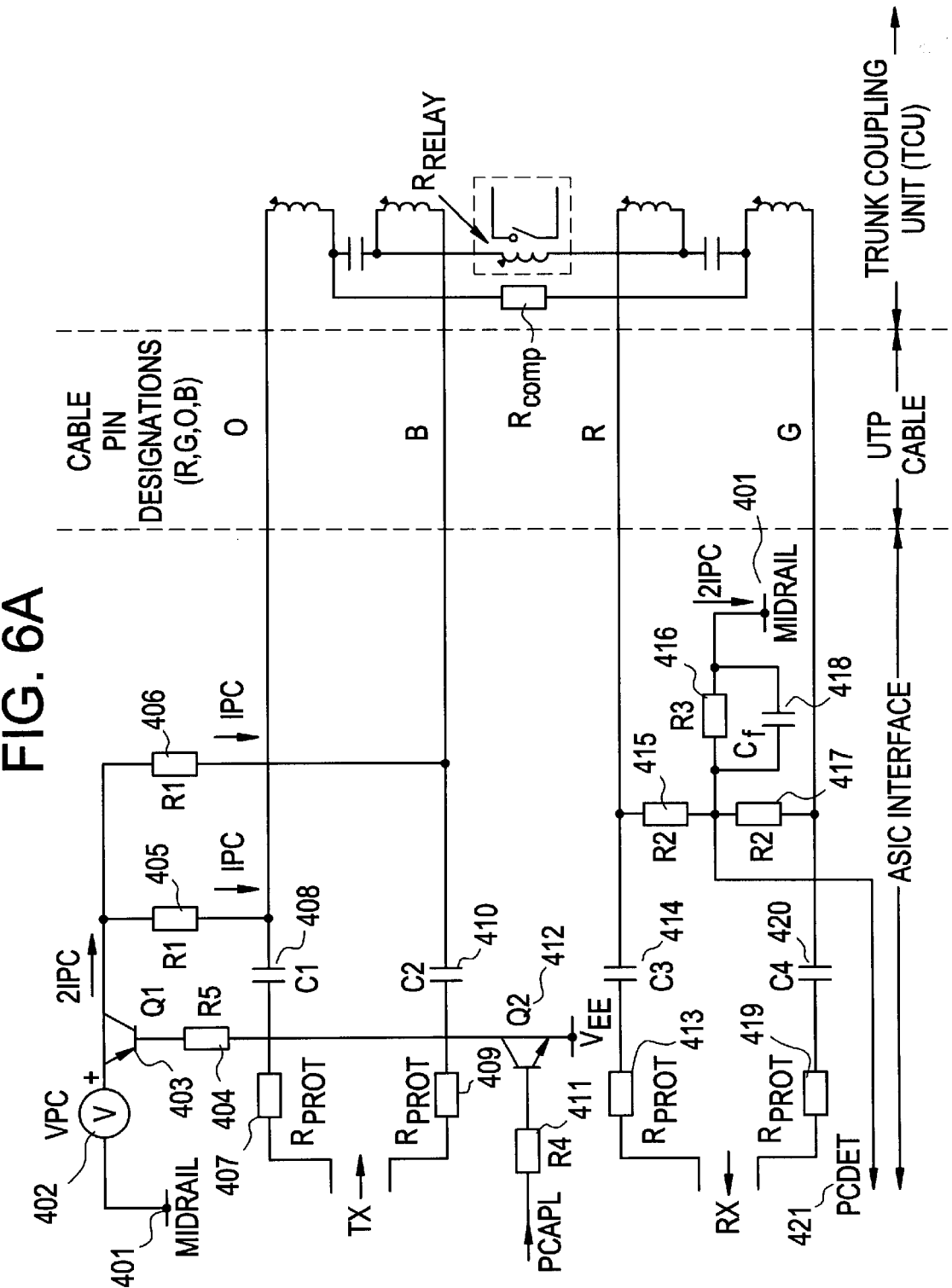
FIGS. 6A and 6B are schematics illustrating token ring termination according to an embodiment of the present invention.
Figure 6B:
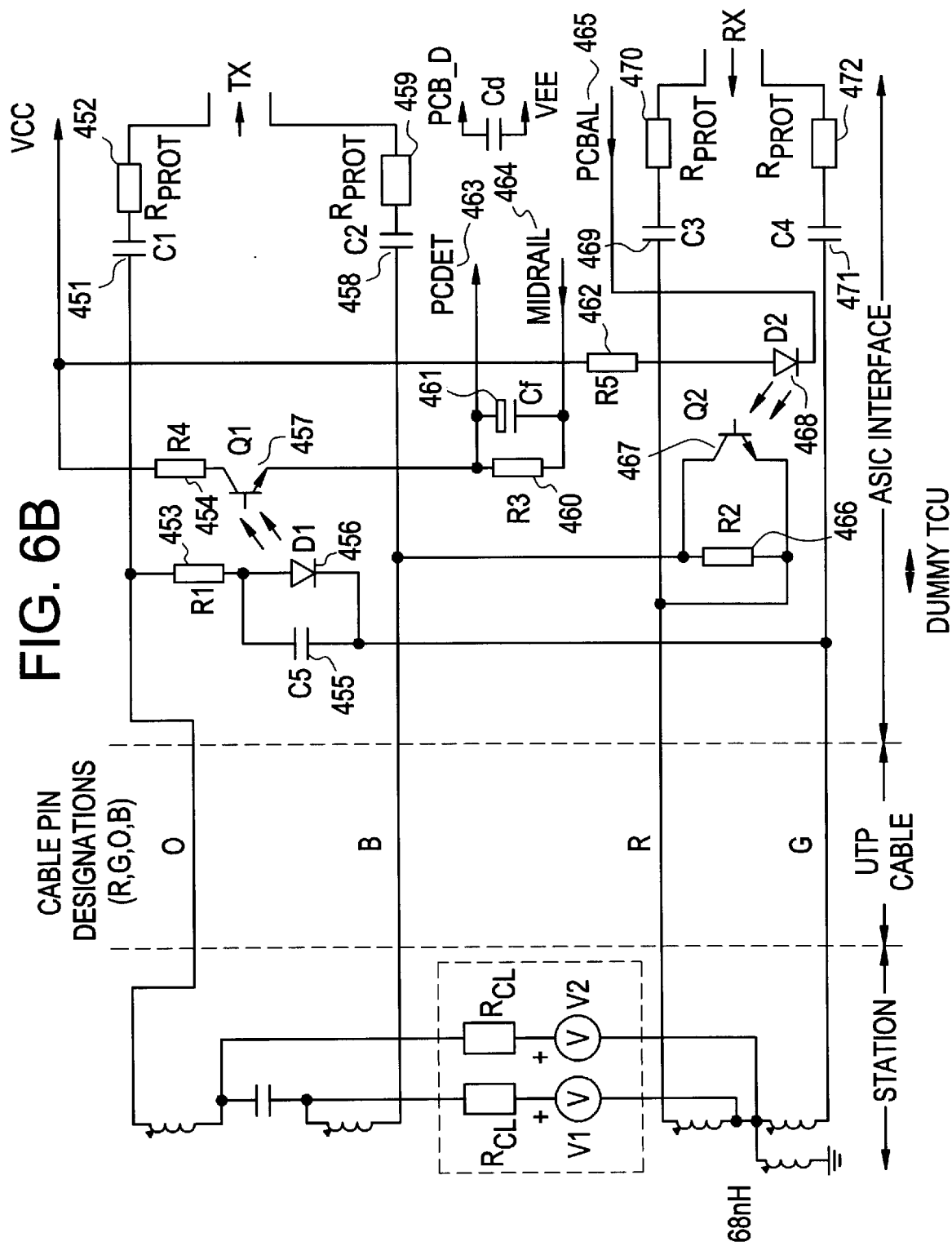

FIGS. 6A and 6B are schematics of the token ring interface with respect to the equipment side and distribution side, respectively, of the cross connect matrix. These figures also illustrate the connections at the trunk coupling unit and the computer station. However, these portions of the figures are not part of the cross connect switch, but are part of the system into which the cross connect switch is placed. As illustrated in FIG. 6A, on the equipment side, the phantom current must be detected at the receive port. The differential pair of the receive port are connected together by two resistors 415, 417, each having a typical value of 2K ohms (±1%). A resistor, having a value of approximately 50 ohms, and a capacitor, having a value of approximately 0.1 µF, are connected in parallel from the center point of the two resistors to the midrail 401. The phantom current is detected at the center point of the two resistors 415, 417. On the transmit port, a phantom current supply 402, having a reference of the midrail 401, is selectively connected to the two wires of the transmit pair through resistors 405, 406. The selective connection is made from a signal through resistor 411 to connect the transistor 412 to the reference voltage VEE. When the transistor 412 is turned on, the voltage VEE is connected is through resistor 404 to the base of transistor 403 to connect the phantom current voltage supply 402 to the transmitting port. Resistors 405 and 406 typically have values of 2K ohms. Resistors 411 and 404 typically have values of 10K ohms. Each of the wires on the pair also includes a current limiting resistance 407, 409, 413, 419, and a filtering capacitor 408, 410, 414, 420. The current limiting resistance has a typical value of 2.7 ohms. The filtering capacitances typically have a value of 0.1 µF.

As illustrated in FIG. 6B, the token ring interface on the distribution side operates to detect the phantom current generated by the station. The midrail and the phantom current detector line are connected together through resistance and capacitance 460, 461.

The present invention has the capability of operating with a variety of different protocols. Table 1 illustrates different protocols, the speeds at which they operate, and the ports used for transmission and reception.

TABLE 1

| Protocol | Speed (Mbps) | TX pair | RX pair | special circuit | DC |
|---|---|---|---|---|---|
| ISDN S/T | 0.192 | 2 | 1 | pair selection, DC blocking | −48 V |
| AS-400 | 1 | 1 | 1 | pair selection, dynamic termination and amplifier switching | — |
| T1 | 1.544 | 3 | 2 | pair selection | — |
| IBM 3270 | 2.358 | 1 | 1 | pair selection, dynamic termination and amplifier switching | — |

TABLE 1-continued

| Protocol | Speed (Mbps) | TX pair | RX pair | special circuit | DC |
|---|---|---|---|---|---|
| Token-ring | 4/16 | 2 | 1 | pair selection, phantom current detect and generate, fault detect and generate | 7 V |
| Ethernet | 10 | 3 | 2 | pair selection | — |
| ATM-25 | 25.6 | 2 or 3 | 1 or 4 | pair selection | — |
| T3 | 44.736 | 3 | 4 | pair selection | — |
| TP-DDI | 100 | 3 | 4 | pair selection, high bandwidth | — |
| Fast-Ethernet | 100 | 3 | 2 | pair selection, high bandwidth | — |
| RS-422 | 0–0.1 | 3 | 4 | pair selection | — |
| RS-232 | 0–0.1 | 3 | 4 | pair selection | — |
| baseband video | 0–6 MHz | 3 | 4 | pair selection | — |

Using the central management station 15, commands are sent from the computer controller 17 to the different I/O blocks in order to indicate the type of protocol to be implemented in that I/O block. Based upon the protocol to be implemented, the I/O block operates in different manners in order to provide the proper functions for the protocol. Indicated in Table 1 are the circuit switch function for each protocol. For all the protocols, the appropriate differential pairs are selected using the switching mechanisms 212, 222. For certain types of protocol, the termination is dynamically controlled using terminators 211, 221. With respect to token ring protocols, as discussed above, a phantom current detection and generation is performed, as well as fault detection and generation. As indicated in Table 1, the various communication protocols operate over different bandwidths. It is important to warrant 0 DB insertion loss over a bandwidth which covers all of the protocols of interest. If the I/O blocks or a cross point modules introduced some amount of insertion loss inside the frequency range of a protocol, it is necessary to compensate for this loss. Wide bandwidth amplifiers are used to overcome the insertion loss.

In addition to selecting the protocols for each I/O block, the central management station 15 also controls the receive cross point module 240 and transmit cross point module 230 in order to connect together appropriate I/O blocks on the distribution side and equipment side of the cross connect switch. The cross connect switch of the present invention allows different protocols to be used simultaneously through the switch without the need of specialized circuitry. Thus, for each port, different protocols can be used based upon the equipment being connected to. Since the protocols and the equipment can be controlled from the central management station, physical changes for interconnecting equipment or changing protocols are not required.

Having thus described the embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A network interconnection apparatus comprising:
    at least one analog cross connect module comprising:
        a plurality of inputs selectively connected in communication with a plurality of outputs, and at least one compensation circuit connected in communication between one of said inputs and one of said outputs, the compensation circuit having a gain that produces a 0 dB insertion loss introduced by a signal travelling from one of said inputs to one of said outputs over a bandwidth in corn with all of the protocols of interest;

at least one D/A converter connected to one of said inputs;

at least one A/D converter connected to one of said outputs; and a plurality of input/output blocks, each input/output block comprising:
  a block output connected to one of the inputs of the cross connect module,
  a block input connected to one of the outputs of the cross connect module,
  at least one port connected to a corresponding device in the network, and
  a connection circuit for selectively connecting the block output and block input to the at least one port.

2. The network interconnection apparatus of claim 1, wherein the at least one port includes at least three ports, and wherein the connection circuit selectively connects one of the at least three ports to the block input, and another one of the at least three ports to the block output.

3. The network interconnection apparatus of claim 1, further comprising a control circuit, and wherein the connection circuit selectively connects the at least one port and the block input and block output based upon input signals from the control circuit.

4. The network interconnection apparatus of claim 3, wherein the inputs and outputs of the cross connect module are selectively connected based upon a signal from the control circuit.

5. The network interconnection apparatus of claim 1, wherein the connection circuit includes a bidirectional switch matrix.

6. The network interconnection apparatus of claim 1, wherein each of the input/output blocks further includes:
  a termination module for selectively terminating the at least one port into an appropriate impedance.

7. The network interconnection apparatus of claim 6, wherein the termination module selectively terminates the at least one port when the at least one port is connected to the block output.

8. The network interconnection apparatus of claim 1, wherein each of the input/output blocks further includes:
  at least one compensation amplifier, connected between the at least one port and one of the block input and block output, to account for signal attenuation.

9. The network interconnection apparatus of claim 1, wherein the input/output blocks include signal connection circuitry required by each of a plurality of communication protocols.

10. The network interconnection apparatus of claim 1, wherein the input/output block further includes half duplex control circuitry for selectively connecting a single port to the block input and block output to provide bidirectional communication through the single port.

11. The network interconnection apparatus of claim 10, wherein the half duplex control circuitry includes:
  a line monitor for monitoring the block input to detect a signal received from the cross connect module;
  a switch for connecting the block input to the single port when a signal is detected by the line monitor; and
  a switch for connecting the block output to the single port when a signal is not detected.

12. The network interconnection apparatus of claim 11, wherein the half duplex control circuitry includes a termination connector for connecting the single port to a termination impedance when the signal is not detected.

13. The network interconnection apparatus of claim 11, wherein the half duplex control circuitry includes a second line monitor for monitoring the single port to detect a signal received from the single port.

14. The network interconnection apparatus of claim 1, wherein the at least one port on each of two input/output blocks connected through the cross connect module includes two ports, and the apparatus further comprises:
  a phantom current detector connected to one of the ports of one of the input/output blocks for detecting a first phantom current;
  a phantom current generator connected to one of the ports of the other of the input/output blocks for generating a second phantom current when the first phantom current is detected.

15. The network interconnection apparatus of claim 14, further comprising:
  means for transmitting detection of the first phantom current from the one input/output block to the other input/output block through the cross connect module.

16. The network interconnection apparatus of claim 14, further comprising:
  means for detecting a line fault on the port of the one input/output block; and
  means for simulating a line fault on the port of the other input/output block.

17. The network interconnection apparatus of claim 1, wherein the cross connect module includes a plurality of analog cross connect switches.

18. The network interconnection apparatus of claim 1, wherein the cross connect module includes a plurality of digital routing switches.

19. The network interconnection apparatus of claim 1 wherein the signal has a speed between 0.192 Mbps to 100 Mbps.

20. The network interconnection apparatus of claim 1 wherein the signal a speed over 100 Mbps.

21. A network interconnection apparatus comprising:
  at least one analog cross connect module comprising:
    a plurality of inputs selectively connected in communication with a plurality of outputs, and
    at least one compensation circuit connected in communication between one of said inputs and one of said outputs, the compensation circuit having a gain that produces a 0 dB iron loss introduced by a signal travelling from one of said inputs to one of said outputs over a bandwidth in common with all of the protocols of interest;
  at least one D/A converter connected to one of said inputs;
  at least one A/D converter connected to one of said outputs; and
  a plurality of input/output blocks connected to the inputs and outputs of the cross connect module, each input/output block including:
    at least one port for transmitting signals from the cross connect module and receiving signals to be transferred to the cross connect module, and
    a protocol operation circuit, receiving a protocol selection signal indicating one of a plurality of protocols, for transmitting and receiving signals through the at least one port according to the protocol indicated by the protocol selection signal.

22. The network interconnection apparatus of claim 21, wherein the protocol operation circuit includes a termination circuit for selectively terminating the at least one port based upon the protocol selection signal.

23. The network interconnection apparatus of claim 21, the at least one port includes a plurality of ports, and wherein the protocol operation circuit includes port selection circuits for selecting at least one of the plurality of ports for receiving signals and transmitting signals.

24. The network interconnection apparatus of claim 21, wherein the protocol operation circuit includes means for selectively transmitting signals and receiving signals through a single port at different times.

25. The network interconnection apparatus of claim 21, wherein the protocol operation circuit includes:

a phantom current detection circuit for detecting a phantom current based upon the protocol selection signal and generating a phantom current detection signal; and a phantom current generator circuit for generating a phantom current based upon a protocol selection signal and a phantom current detection signal.

26. The network interconnection apparatus of claim 21 wherein the signal has a speed between 0.192 Mbps to 100 Mbps.

27. The network interconnection apparatus of claim 21 wherein the signal has a speed over 100 Mbps.

28. A network interconnection apparatus comprising:

at least one differential pair input/output port, each differential pair input/output port connected to a line terminator and at least one reception switch;

at least one auxiliary amplifier connected between the at least one reception switch and at least one second switch;

one of the at least one reception switch connected to an attenuator and a first line monitor;

the attenuator further connected to an input of a first compensation amplifier;

the first line monitor further connected to a half duplex controller;

the half duplex controller further connected to a second line monitor;

the second line monitor further connected to one of the at least one second switch and an output of a second compensation amplifier;

the output of the first compensation amplifier connected to a third switch;

the third switch further connected to a fourth switch and to at least one interface input/output port; and the fourth switch further connected to the input of the second compensation amplifier, a terminator, and at least one interface input/output.

* * * * *

UNITED STATES PATENT AND TRADEMARK OFFICE
CERTIFICATE OF CORRECTION

PATENT NO. : 6,414,953 B1  Page 1 of 1
DATED : July 2, 2002
INVENTOR(S) : Francois Lamarche and John Gauthier It is certified that error appears in the above-identified patent and that said Letters Patent is hereby corrected as shown below:

<u>Column 3,</u>
Line 20, please replace "(I/0)" with -- (I/O) --.

<u>Column 7,</u>
Line 6, please replace "corn" with -- common --.

<u>Column 8,</u>
Line 41, please insert -- has -- after "signal".
Line 49, please replace "iron" with -- insertion --.

Signed and Sealed this

Seventeenth Day of December, 2002

JAMES E. ROGAN
*Director of the United States Patent and Trademark Office*